United States Patent [19]

Thomas

[11] 4,434,507

[45] Feb. 28, 1984

[54] FREE STANDING TRANSMITTING MICROPHONE

[75] Inventor: Elmer L. Thomas, Placentia, Calif.

[73] Assignee: Chevron Research Company, San Francisco, Calif.

[21] Appl. No.: 413,325

[22] Filed: Aug. 31, 1982

[51] Int. Cl.³ .............................................. H04B 1/034

[52] U.S. Cl. ...................................... 455/95; 455/128; 179/121 D; 381/77; 381/92; 381/122

[58] Field of Search ........................ 455/89, 90, 95, 97, 455/128; 179/121 R, 121 D; 381/77, 92, 122

[56] References Cited

U.S. PATENT DOCUMENTS

| | | | |
|---|---|---|---|
| 2,838,127 | 6/1958 | Jilski et al. | 179/121 D |
| 2,840,694 | 6/1958 | Morgan | 455/95 |
| 3,564,416 | 2/1971 | Price | 455/95 |
| 4,344,184 | 8/1982 | Edwards | 455/128 |

FOREIGN PATENT DOCUMENTS

| | | | |
|---|---|---|---|
| 2390049 | 1/1979 | France | 455/128 |

*Primary Examiner*—Jin F. Ng

*Attorney, Agent, or Firm*—G. W. Wasson; L. S. Gruber; Edward J. Keeling

[57] ABSTRACT

A free standing transmitting microphone comprising a hollow holder for enclosing a transmitter and a microphone on a base. A cover of conductive material above the holder functions as an antenna for the transmitter. An acoustic pathway between the holder and the cover directs sounds to the microphone.

7 Claims, 7 Drawing Figures

FREE STANDING TRANSMITTING MICROPHONE

This invention relates to a device for containing and supporting a transmitting microphone and, more particularly, to a device which totally contains the microphone, the transmitter and the antenna for the transmitter of a transmitting microphone and which is adapted to be in a free standing position with respect to the users thereof.

BACKGROUND OF THE INVENTION

In reasonably large conference rooms where several participants and an audience may observe the conference of several participants, it has become a convenient practice to provide an amplified microphone facility for each of the participants in the conference. The usual form of such amplified system involves either an individual microphone mounted on the table in front of each of the participants or some form of a microphone attached to the person or hung around the person's neck with the usual amounts of microphone connections in the form of wires from those microphones to the central amplifying system. More recently, due to electronic miniaturization, the microphones have been equipped with individual transmitters which permit the elimination of the wires between the microphone and a central amplifying system. Each such transmitting microphone contains its own microphone and transmitting source and a central receiver is adapted to receive the signals from each of the microphones and provide for amplification to assist those participating in the conference or those who are in the audience and wish to hear what the participants are saying. Prior forms of such transmitting microphones have still been hand-held, held by the conventional microphone support or attached in some manner to the participants.

The present invention is a functional and esthetically attractive device for accommodating a self-transmitting microphone in a structure that permits the microphone to be responsive to the sounds produced by those participating in the conference while attenuating those signals which are produced by the amplified form of the sounds. This function is accomplished in a free standing microphone support which combines the microphone, the transmitter and the antenna for the transmitter in a single device.

BRIEF DESCRIPTION OF THE DRAWINGS

The apparatus is illustrated in the attached drawings wherein.

DESCRIPTION OF THE PREFERRED EMBODIMENTS

Figure 3:
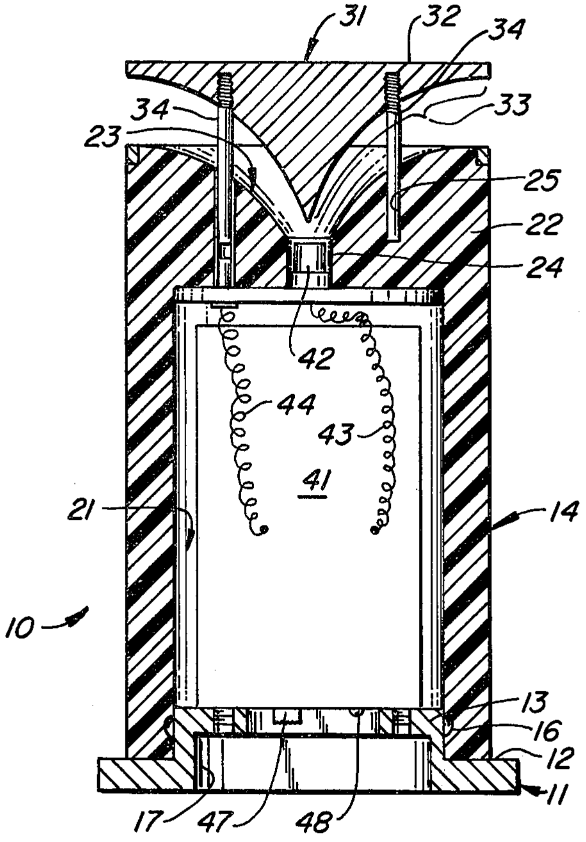
FIG. 3 is a sectional view through the free standing transmitting microphone illustrating the microphone, the compartment for holding the transmitter, and the connection to the antenna system.
Figure 4:
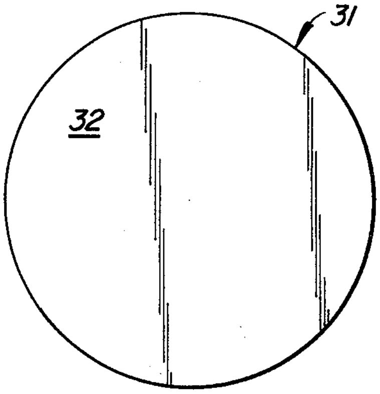
FIG. 4 is a top plan view of the microphone holder illustrating the transmitter antenna.

The free standing transmitting microphone holder assembly 10, as shown in cross-section in FIG. 3, constitutes a base member 11 adapted with shoulders 12 and a raised central portion 13 for support of a non-conductive hollow housing 14. A plurality of easy release spring biased connectors 15 are mounted in the raised portion 13 of the base and cooperate with indentations 16 in the interior body of the housing 14 to connect the housing to the base in a secure manner. The raised portion 13 is also cut out at 17 to provide an access to the interior of the housing 14 from the base and the cut-out or recess 17 is further opened through the raised portion 13 with an opening 18 to provide for the access to the transmitter within the housing 14.

The housing is a hollow cylindrical tube, which provides an interior portion 21 with sidewalls and may be constructed of any nonconductive material such as plastics or wood. The upper portion of the housing 22 is molded or machined with a concave, conical entry at 23 terminating at its apex in an opening 24 providing access into the interior 21 of the housing.

The free standing microphone assembly is completed with a top member 31 formed to establish a conductive top plate 32 with an underside convex conical poriton 33. The top member may be formed of one solid piece or the top plate and conical portion may be separate and joined to produce the desired configuration. A plurality of conductive stand-off members 34 are secured to the under-surface of the top member 31 passing through the conical portion 33 and extending away from the top member in the direction opposite to the surface of the top. These conductive stand-off members are adapted to cooperate with and are aligned with the holes 25 in the upper portion 22 of the housing 14. The conductive stand-off members are in electrical connection with the top member 31.

Figure 5:
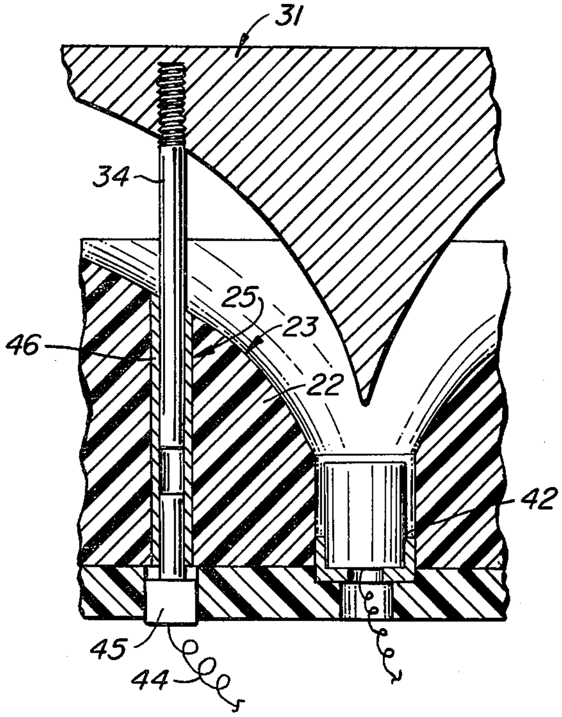
FIG. 5 is an enlarged sectional view illustrating the connection between the transmitter and the antenna system.
Figure 6:
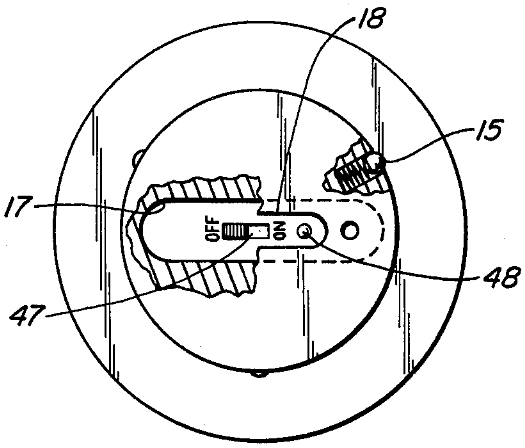
FIG. 6 is a partial sectional view of the bottom of the microphone holder illustrating the base and the means for holding the housing onto the base of the holder.
Figure 7:
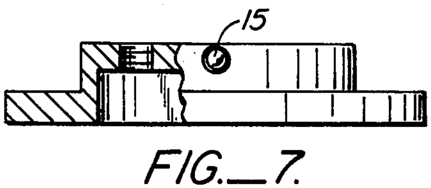
FIG. 7 is a partial sectional view of the base portion.

It should be evident by viewing FIG. 3 the interior hollow portion 21 of the housing 14 is adapted to accommodate a miniature transmitter 41 and the microphone 42 with an electrically conductive connector 43 between the microphone and the transmitter and an electrically conductive member 44 between the transmitter and the stand-off member 34. The conductor 44 is adapted with a plug member 45 which is in contact with an electrically conductive insert 46 in the hole 25 in the top of 22 of the housing member 14. The plug member is in electrical contact with the insert 46 in the same way that the stand-off member 34 from the top member 31 is in contact with the inesrt 46. The microphone 42 may be supported by any suitable means in the housing 14 such as on a shouldered cut-out as shown in FIG. 5 or by being press fit into a cut-out with a flexible ring (O-ring) to hold it in place. These arrangements are more clearly illustrated in FIG. 5.

The base member 11, as previously described, is adapted with a cut-out or recess 17 to accommodate access to a switch 47 at the base of the transmitter 41 and to provide visible indication of the condition of the transmitter by an indicator light 48, also at the base of the transmitter.

Figure 1:
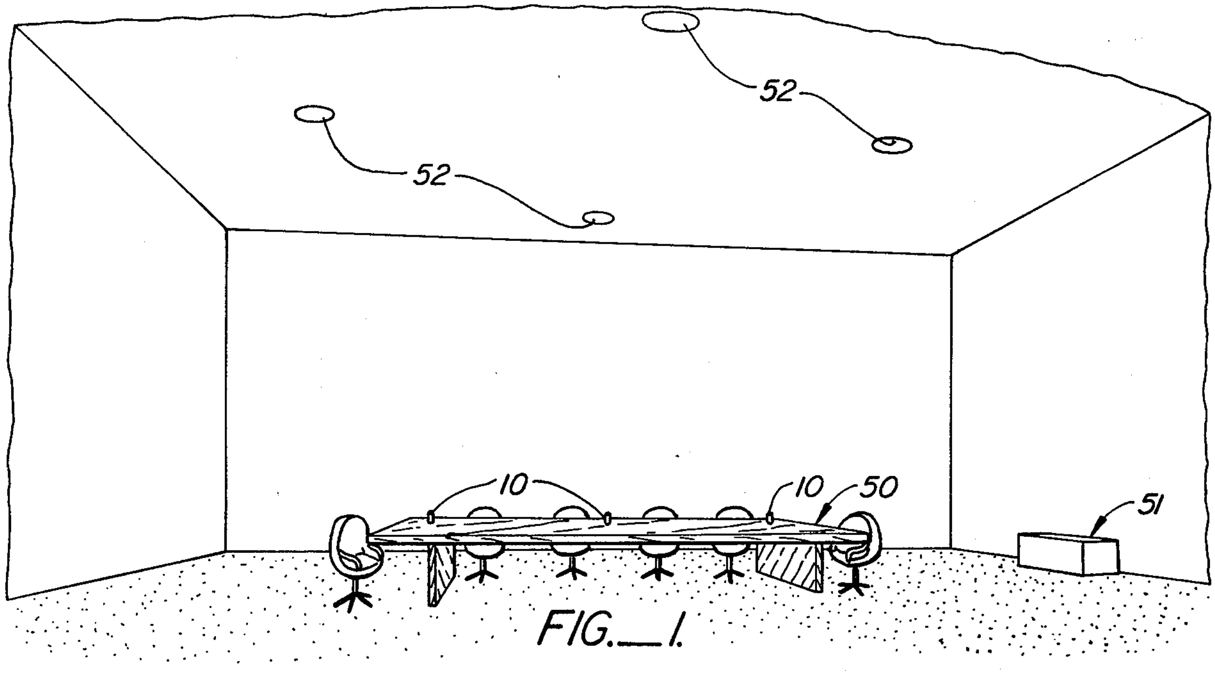
FIG. 1 is a perspective view of a representation of a conference room including a conference table and placement of the free standing transmitting microphones, the amplifier receiver, and the loudspeaker system for reproducing the signals.
Figure 2:
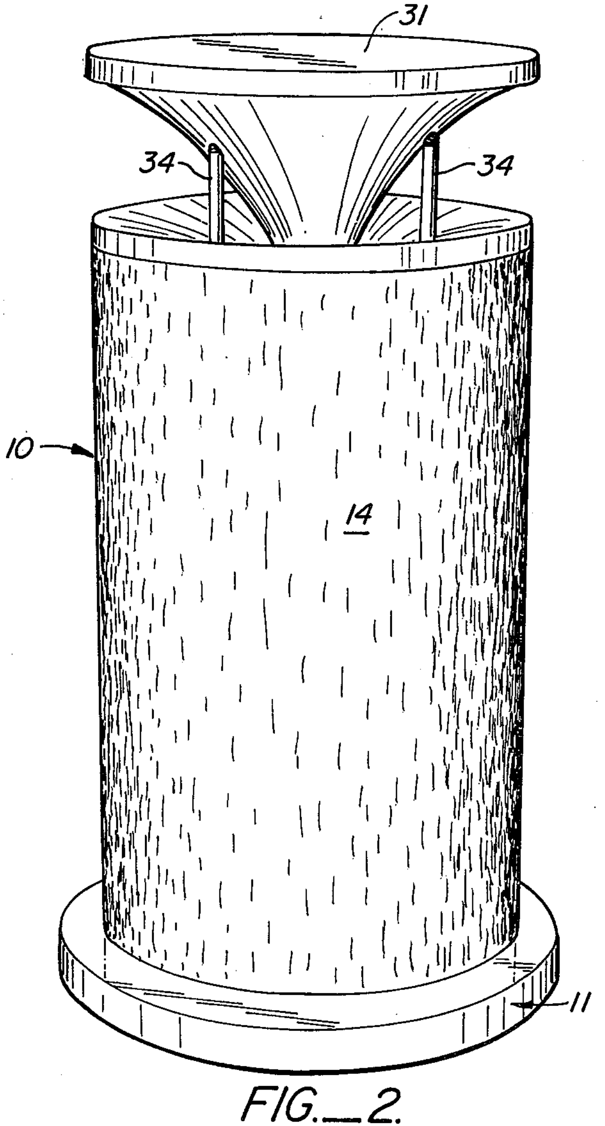
FIG. 2 is a perspective view of the free standing transmitting microphone.

The operation of the free standing transmitting microphone assembly of the present invention should be readily apparent from the foregoing description of its elements and from the description of the prior art. It should be apparent that the assembly 10 is readily adapted to be positioned in a conference table as shown in FIG. 1 at 50 on the table top within the acoustic range of the person sitting at the table or other sound sources within the room. The room may include a receiver amplifier 51 which is adapted to receive signals from the transmitting microphone assemblies 10 and to provide amplified signals to a series of speakers 52 which as illustrated in FIG. 1, may be mounted in the ceiling of the conference room. When not in use, the transmitters may be turned off by the switch 47 and, when in use, the transmitter and its battery condition may be indicated by the glow of an indicator lamp 48, both accessible through the base member 11 of the transmitter 10.

Sounds of persons or other sources around the conference table are channeled through the complimentary acoustic pathway openings between the top member 31 and the housing 14 to be directed to the microphone 42 which is positioned at the base of the concave entry into the housing. Signals received by the microphone are amplified in the transmitter 41 and electrical signals are communicated to the top member 32 through the electrical connection between the transmitter and one of the conductive stand-off members 34 which supports the top member 31 above the housing 14. The top member, being electrically conductive, functions as an antenna to transmit signals through the amplifier receiver 51 for further amplification and distribution to suitable sound systems 52.

The free standing transmitting microphone assembly of the present invention provides both an attractive accommodation for transmitting microphones and an efficient collection means for sounds generated at a conference table. The complimentary acoustic pathway openings into the housing are omni-directional thus avoiding any restriction to sounds arriving at the microphone from a horizontal direction; however, because of the flat top and of the construction of the acoustic pathways, the microphone is insensitive, or at least less sensitive, to sound sources which are received from vertically above the assembly. In that regard the microphone assembly and its construction reduces the problem of "feedback" which frequently occurs with amplification of sound signals in the confined area.

While a certain preferred embodiment of the invention has been specifically disclosed, it should be understood that the invention is not limited thereto as many variations will be readily apparent to those skilled in the art and the invention is to be given its broadest possible interpretation with the terms of the following claims.

What is claimed is:

1. A free standing, transmitting microphone assembly comprising:

a base member;

means in said base member for supporting a miniature radio transmitter including a power supply;

a hollow housing member removably supported on said base member and enclosing said transmitter;

a conductive top member removably supported on said housing member;

means in the interior of said housing member for supporting a microphone;

said housing member and said top member being formed with complimentary acoustic pathway openings for directing acoustic energy toward said microphone from locations generally horizontal with respect to said housing member and top member;

said top member being formed with respect to said means for supporting said microphone in said housing member to substantially prevent acoustic energy from travelling to said microphone from generally vertically above said top member;

means for accommodating a connection between said microphone and said transmitter; and electrically conductive means for accommodating a connection between said transmitter and said conductive top member whereby said top member is electrically energized to function as a radiating antenna for said transmitter.

2. The free standing, transmitting microphone assembly of claim 1 wherein said base member includes a recessed portion providing access to an ON-OFF switch for said power supply.

3. The assembly of claim 2 wherein said transmitter power supply includes a battery power source and a visual means for displaying the electrical condition of said battery, said visual means being aligned with said recessed portion of said base member.

4. The assembly of claim 1 wherein said top member is supported on said housing member by a plurality of conductive stand-off members, removably fixed to the underside of said top member and passing through said complimentary acoustic pathway openings between said top member and housing member, said housing member being adapted to engage said stand-off members to permit said top member to be removably supported on said housing member, and at least one of said stand-off members being in electrical contact with said means for accommodating said connection between said transmitter and said conductive top member to accomplish said connection between said transmitter and said top member.

5. The assembly of claim 1 where said complimentary acoustic pathway openings are formed to produce an acoustic path to direct horizontally oriented sound toward a vertically mounted microphone.

6. The assembly of claim 1 wherein said base member and said housing member are adapted with easy release connections and said means connecting said microphone to said transmitter and said electrically conductive means connecting said transmitter to said top member include disconnectable connectors.

7. The assembly of claim 1 with a miniature radio transmitter mounted within said housing member, a microphone mounted within said housing member in said acoustic pathway, and electrically conductive means connecting said microphone to said transmitter and said transmitter to said means connecting said top member to said housing whereby said microphone drives said transmitter to energize said conductive top member.

* * * * *